United States Patent
Lee et al.

(10) Patent No.: US 10,419,736 B2
(45) Date of Patent: Sep. 17, 2019

(54) METHOD AND APPARATUS FOR GENERATING THREE-DIMENSIONAL IMAGE

(71) Applicant: Samsung Electronics Co., Ltd., Suwon-si, Gyeonggi-do (KR)

(72) Inventors: Seok Lee, Hwaseong-si (KR); Dongwoo Kang, Seoul (KR); Byong Min Kang, Yongin-si (KR); Dong Kyung Nam, Yongin-si (KR); Juyong Park, Seongnam-si (KR); Jingu Heo, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 395 days.

(21) Appl. No.: 14/813,626

(22) Filed: Jul. 30, 2015

(65) Prior Publication Data

US 2016/0156902 A1 Jun. 2, 2016

(30) Foreign Application Priority Data

Dec. 1, 2014 (KR) .......................... 10-2014-0169678

(51) Int. Cl.
*H04N 13/117* (2018.01)
*H04N 13/376* (2018.01)
*H04N 13/398* (2018.01)

(52) U.S. Cl.
CPC ......... *H04N 13/117* (2018.05); *H04N 13/376* (2018.05)

(58) Field of Classification Search
CPC ........... H04N 13/0409; H04N 13/0402; H04N 13/239; H04N 13/117; H04N 13/376; G02B 26/10

USPC .......................... 348/54, 43, 46; 345/419, 690
See application file for complete search history.

(56) References Cited

U.S. PATENT DOCUMENTS

| | | | |
|---|---|---|---|
| 8,890,855 B1 | 11/2014 | Park et al. | |
| 2012/0169724 A1 | 7/2012 | Park et al. | |
| 2013/0136302 A1 | 5/2013 | Nam et al. | |
| 2014/0028662 A1* | 1/2014 | Liao | H04N 13/0402 345/419 |
| 2014/0035959 A1* | 2/2014 | Lapstun | G02B 26/10 345/690 |
| 2014/0049622 A1* | 2/2014 | Tsurumi | H04N 13/0409 348/54 |
| 2016/0065947 A1* | 3/2016 | Cole | H04N 13/239 348/43 |

FOREIGN PATENT DOCUMENTS

| | | |
|---|---|---|
| KR | 10-0159406 B1 | 8/1998 |
| KR | 10-0420791 B1 | 3/2004 |
| KR | 20110049039 A | 5/2011 |
| KR | 20110136326 A | 12/2011 |
| KR | 10-1172507 B1 | 8/2012 |

* cited by examiner

*Primary Examiner* — Albert Kir
(74) *Attorney, Agent, or Firm* — Harness, Dickey & Pierce, P.L.C.

(57) ABSTRACT

A method for generating a three-dimensional (3D) image may detect a current eye position of a user and render a 3D image based on at least one of a previously detected eye position of the user and previously generated stereo images. A cycle at which the current eye position of user is detected and a cycle at which a 3D image is rendered may be asynchronous.

15 Claims, 6 Drawing Sheets

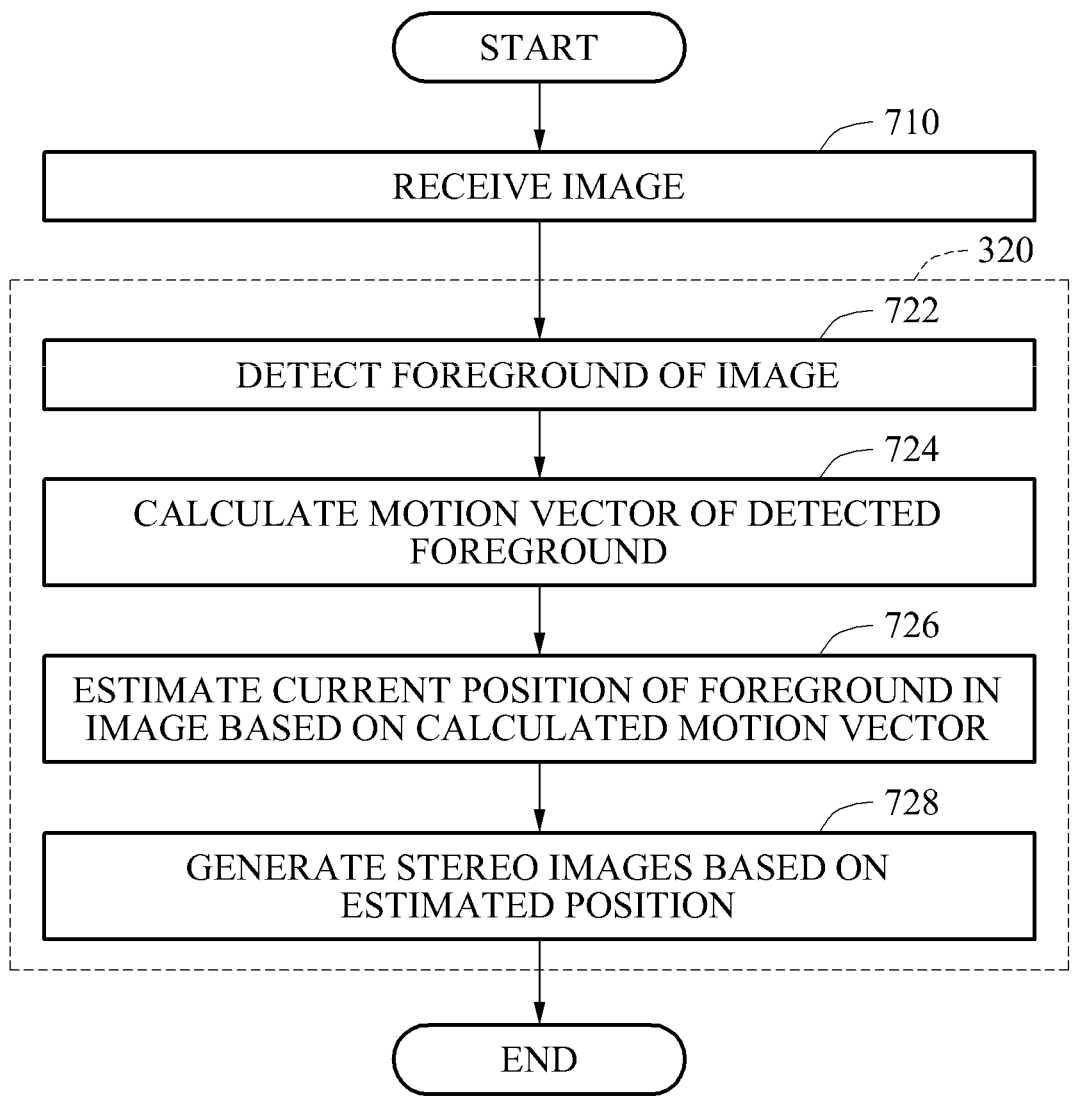

METHOD AND APPARATUS FOR GENERATING THREE-DIMENSIONAL IMAGE

CROSS-REFERENCE TO RELATED APPLICATION

This application claims the priority benefit of Korean Patent Application No. 10-2014-0169678, filed on Dec. 1, 2014, in the Korean Intellectual Property Office, the entire contents of which are incorporated herein by reference in its entirety.

BACKGROUND

1. Field

At least one example embodiment relates to a method and/or apparatus for generating a three-dimensional (3D) image, and more particularly, to a method and/or apparatus for generating the 3D image in which a plurality of processes are asynchronously operated.

2. Description of the Related Art

Three-dimensional (3D) video displays may be categorized as a glasses type display and a glasses-free type display. A method of providing a 3D video in a glasses-free type display may provide left and right images to both eyes of a user. To provide the images of the left and right images to the respective eyes, positions of the right eye and the left eye may be tracked. For example, positions of the right eye and the left eye may be detected, and a 3D video may be provided based on the detected positions. When the positions of the right eye and the left eye change (i.e., a user changes position), a user may view a 3D video having a deteriorated image quality.

SUMMARY

At least one example embodiment relates to a method of generating a three-dimensional (3D) image.

In at least one example embodiment, the method may include detecting an eye position of a user, and rendering a 3D image based on at least one of an eye position (e.g., a current eye position) of the user detected in advance and stereo images generated in advance. The detecting and the rendering are performed in parallel.

A cycle of the detecting and a cycle of the rendering may be asynchronized.

The rendering may include estimating a current eye position based on a stored eye position of the user, and rendering the 3D image based on the estimated current eye position and the stereo images generated in advance.

The method of generating a 3D image may further include generating respective stereo images of both eyes of the user based on the eye position of the user detected in advance.

The generating may include estimating a current eye position based on a stored eye position of the user, and generating the respective stereo images based on the estimated current eye position.

The estimating may include calculating a speed vector of numerous detected eye positions and estimating the current eye position based on the speed vector.

The generating may include different operation cycles based on types of contents to be played.

The method of generating a 3D image may further include receiving an image, and the generating may include generating the stereo images using the image.

The generating may include detecting a foreground of the image, calculating a motion vector of the detected foreground, estimating a current position of the foreground in the image based on the calculated motion vector, and generating the stereo images based on the estimated position.

The generating respective stereo images may include generating the stereo images by receiving stereo images generated in advance.

At least one example embodiment relates to an apparatus for generating a three-dimensional (3D) image.

In at least one example embodiment, the apparatus may include an eye tracker configured to detect an eye position (e.g., a current eye position) of a user, and a renderer configured to render a 3D image based on at least one of an eye position of the user detected in advance and stereo images generated in advance. The eye tracker and the renderer are performed in parallel.

A cycle at which the eye tracker may be performed and a cycle at which the renderer is performed are asynchronized.

The apparatus for generating a 3D image may further include a stereo image generator configured to generate respective stereo images of both eyes of the user based on the eye position of the user detected in advance.

The stereo image generator may be configured to estimate a current eye position based on a stored eye position of the user, and generate the respective stereo images based on the estimated current eye position.

The stereo image generator may be configured to calculate a speed vector of numerous detected eye positions, and estimate the current eye position based on the speed vector.

The stereo image generator may be configured to include different operation cycles based on types of contents to be played The apparatus for generating a 3D image may further include an image receiver configured to receive an image. The stereo image generator may be configured to generate the stereo images using the image.

The stereo image generator may be configured to detect a foreground of the image, calculate a motion vector of the detected foreground, estimate a current position of the foreground in the image based on the calculated motion vector, and generate the stereo images based on the estimated position.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 7 is a flowchart illustrating a 3D image generating method according to still at least one example embodiment.

DETAILED DESCRIPTION OF EXAMPLE EMBODIMENTS

Figure 1:
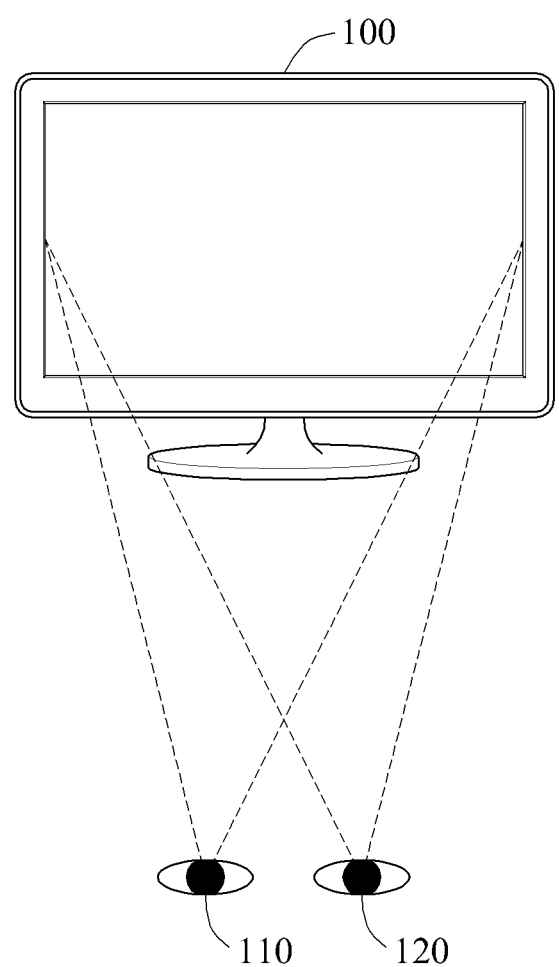
FIG. 1 is a diagram illustrating a viewing of a three-dimensional (3D) video using both eyes of a user according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 is a diagram illustrating a viewing of a three-dimensional (3D) video using both eyes of a user according to at least one example embodiment.

An apparatus 100 for displaying a 3D video may detect positions of a left eye 110 and a right eye 120 of a user viewing a video, and enable the user to sense a 3D effect by displaying respective videos at the detected positions.

In an example, the apparatus 100 may generate respective stereo images for the left eye 110 and the right eye 120 of the user. The apparatus 100 may render the 3D image using the generated stereo images. The apparatus 100 may display the 3D video using a plurality of rendered 3D images.

In another example, when images input or received are stereo images, the apparatus 100 may render a 3D image using the stereo images. The apparatus 100 may display a 3D video using a plurality of 3D images.

According to at least one example embodiment, when frames or images of a video to be displayed are obtained, the apparatus 100 may detect positions of both eyes of a user. When the positions of both eyes of user are detected, the apparatus 100 may generate stereo images based on the detected positions of both eyes and the obtained images. When the stereo images are generated, the apparatus 100 may render a 3D image using the detected positions of both eyes and the generated stereo images.

Accordingly, the apparatus 100 may perform a subsequent operation (e.g., a rendering operation) when a previous operation (e.g., an eye tracking operation) is performed. The 3D image generating method may be a synchronous method.

In a synchronous 3D image generating method, a time required for each operation may be accumulated. When the positions of both eyes of user are changed, the synchronous 3D image generating method is unable to reflect the change, thereby deteriorating an image quality of the 3D video to be displayed. For example, the deterioration in image quality may be due to crosstalk.

As still another example, the apparatus 100 may asynchronously detect positions of both eyes, generate stereo images, and render a 3D image.

When the detecting, the generating, and the rendering are asynchronously performed, accumulated time delay may be reduced (or alternatively, prevented). Since there is no time delay, even when the positions of both eyes of the user are changed, deterioration of the image quality of the 3D video may be mitigated (or alternatively, prevented).

An asynchronous 3D image generating method will be described in detail with reference to FIGS. 2 through 7.

Figure 2:
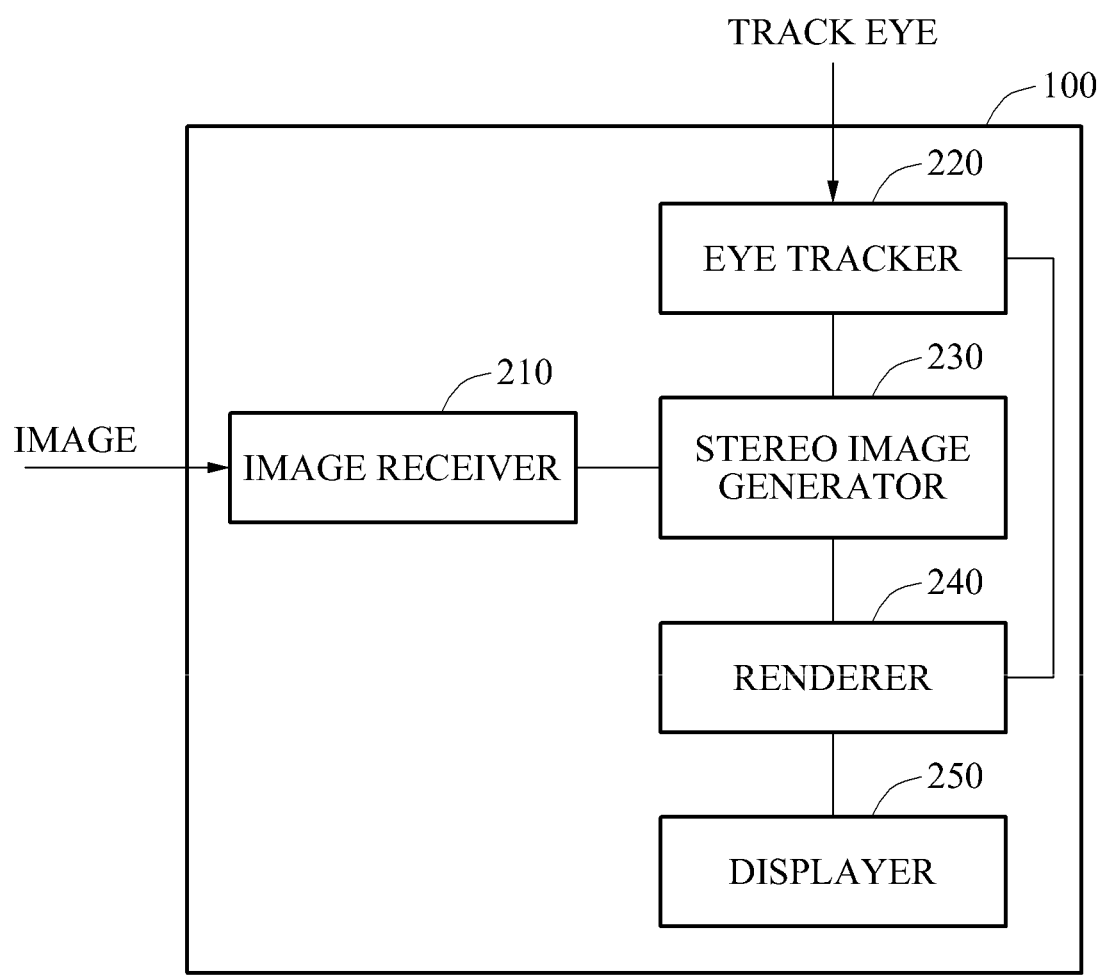
FIG. 2 is a block diagram illustrating a configuration of a 3D image generating apparatus according to at least one example embodiment.

FIG. 2 is a block diagram illustrating a configuration of a 3D image generating apparatus according to at least one example embodiment.

Hereinafter, a 3D image generating apparatus 100 may be simply referred to as an apparatus 100.

The apparatus 100 may include an image receiver 210, an eye tracker 220, a stereo image generator 230, a renderer 240, and a displayer 250. One or more of these elements may be implemented by, for example, one or more special purpose processors.

The image receiver 210 may receive a basic image of a 3D video to be displayed.

In an example, the image receiver 210 may receive respective frames of a two-dimensional (2D) video as the basic image. In another example, the image receiver 210 may receive a 3D graphics file or computer graphics metafile.

The eye tracker 220 may detect positions of both eyes of a user.

The stereo image generator 230 may generate stereo images based on the basic image and the positions of both eyes of the user.

The renderer 240 may generate a 3D image based on the stereo images and the positions of both eyes of the user.

The displayer 250 may display a 3D video based on the 3D image.

The image receiver 210, the eye tracker 220, the stereo image generator 230, the renderer 240, and the displayer 250 will be described in detail with reference to FIGS. 3 through 7. A 3D image generating method with reference to FIGS. 3 through 7 are descriptions of asynchronous method.

Figure 3:
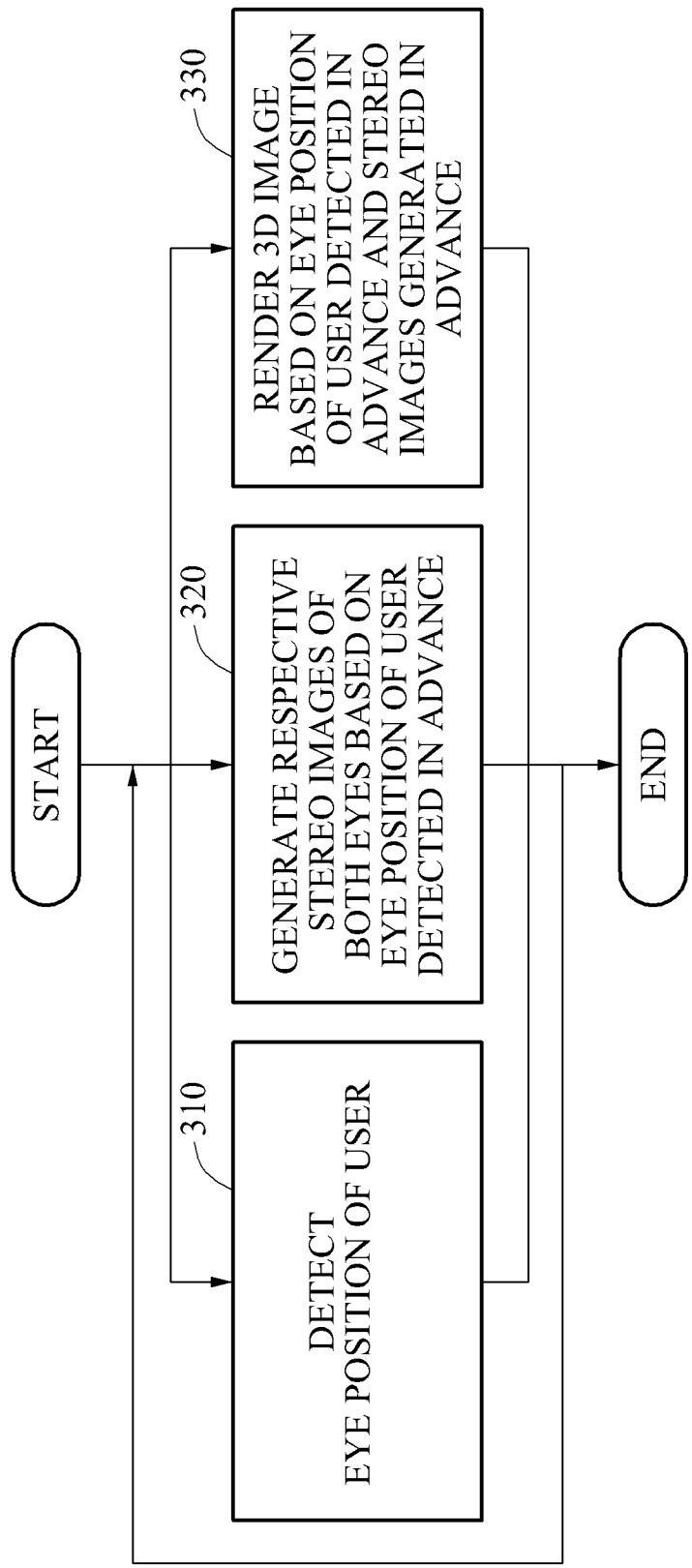
FIG. 3 is a flowchart illustrating a 3D image generating method according to example embodiments.

FIG. 3 is a flowchart illustrating a 3D image generating method according to at least one example embodiment.

In operation 310, the eye tracker 220 may detect an eye position of a user viewing the apparatus 100. As used herein, an eye may refer to both eyes of a user.

For example, the eye tracker 220 may photograph the user using a camera. The eye tracker 220 may detect the eye position of the user using the photographed image of the user.

The eye tracker 220 may photograph the user at a photographing cycle (e.g., a maximum photographing cycle) of the camera.

The eye tracker 220 may detect the eye position at a first cycle. The first cycle may be the maximum photographing cycle of the camera.

In another example, the eye tracker 220 may release a ray to the eyes of user. The eye tracker 220 may detect the eye position of user using the ray reflected from the eyes.

The eye tracker 220 may store the detected eye position of user.

In operation 320, the stereo image generator 230 may generate respective stereo images of both eyes based on an eye position of the user detected in advance.

The eye position of the user detected in advance may be a recently stored eye position (e.g., a most recently stored eye position).

The stereo image generator 230 may use the recently stored eye position of user detected in advance.

The stereo image generator 230 may generate the respective stereo images based on the eye position of the user detected in advance and a received image.

The received image may be an image which is the most recently received.

The stereo image generator 230 may update the stereo images by generating the stereo images in lieu of operation 330 of rendering a 3D image.

The stereo image generator 230 may store the generated stereo images.

The stereo image generator 230 may generate respective stereo images at a second cycle.

The first cycle may be different from the second cycle. The first cycle and the second cycle may be asynchronized. The stereo image generator 230 may include different operation cycles based on types of contents to be displayed. In an example, when an image is displayed, the stereo image generator 230 may be operated once. In another example, when a video is displayed, the stereo image generator 230 may set an operation cycle based on a frame rate of the video. As still another example, when a graphics image is displayed, the stereo image generator 230 may set a cycle based on a rendering speed of the graphics image. The graphics image may be an image including 3D information.

According to at least one example embodiment, operation 320 may be an operation of receiving stereo images. The stereo image generator 230 may receive stereo images generated in advance. The stereo image generator 230 may generate the stereo images by receiving the stereo images generated in advance.

For example, the stereo image generator 230 may receive the stereo images from a camera generating stereo images. A plurality of cameras may be provided.

When the stereo images generated in advance are received, the second cycle may be a cycle at which the stereo image generator 230 receives stereo images.

In operation 330, the renderer 240 may render a 3D image based on an eye position of the user detected in advance and at least one of stereo images generated in advance.

The eye position detected in advance may be a recently stored eye position.

The stereo images generated in advance may be recently stored stereo images.

The renderer 240 may render a 3D image at a third cycle. The third cycle may be different from the first and the second cycles. The third cycle may be asynchronized with the first and the second cycles.

Operations 310, 320, and 330 may be performed in parallel.

Since operations 320 and 330 are performed in parallel, operation 330 may be performed when operation 310 is performed and an eye position of a user is updated, even when stereo images are not updated because operation 320 is not performed. When the detected eye position of user is updated and differs from a desired (or alternatively, predetermined) eye position, the renderer 240 may render a 3D image based on the updated eye position of user.

For example, when the second cycle at which stereo images are received or generated is longer than the first and the third cycles, operations 310 and 330 may be performed even when operation 320 is not performed. In this example, in operation 330, the renderer 240 may render a new 3D image based on the updated eye position of user and desired (or alternatively, predetermined) stereo images.

Figure 4:
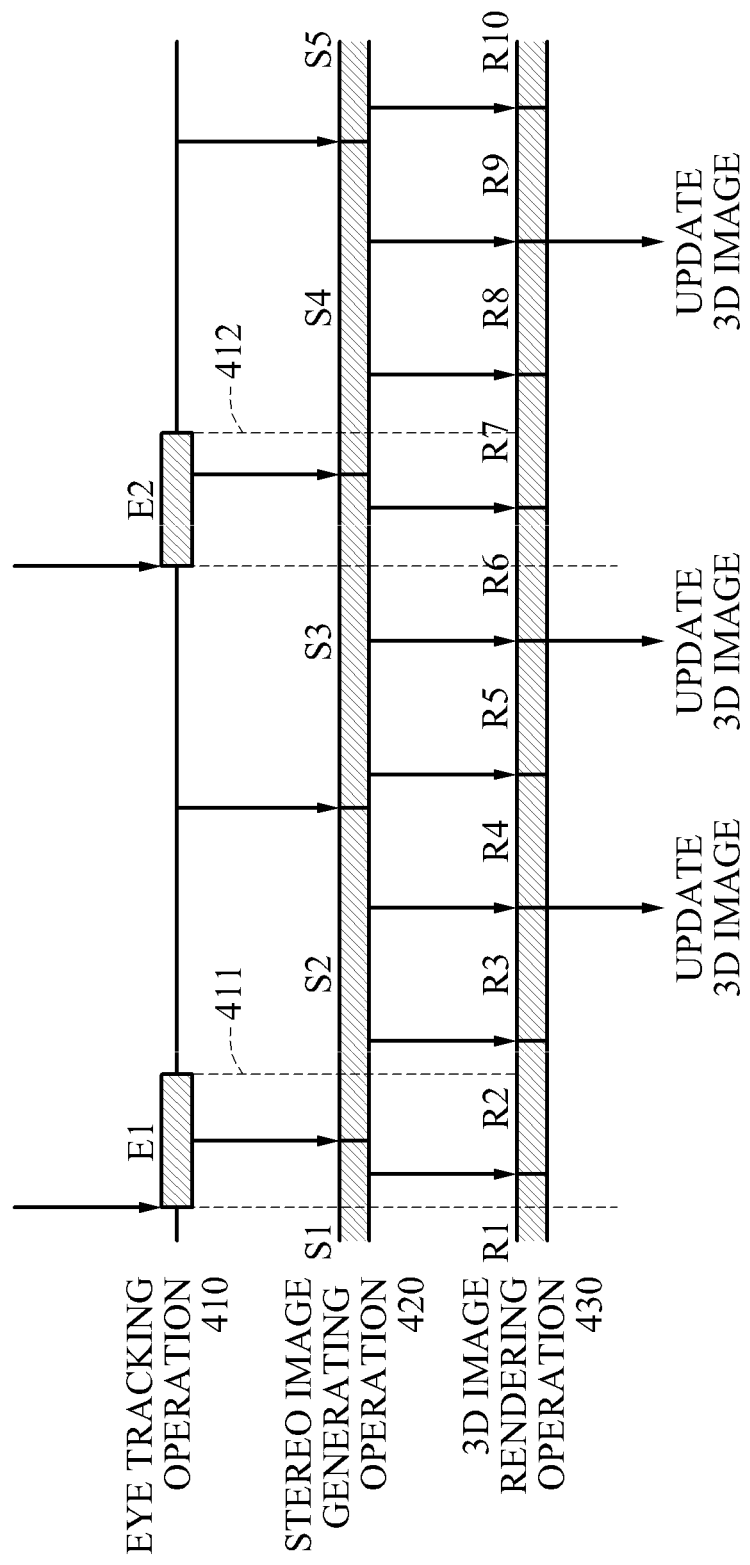
FIG. 4 illustrates a time flow of performing an asynchronous 3D image generating method according to at least one example embodiment.

FIG. 4 illustrates a time flow of performing an asynchronous 3D image generating method according to at least one example embodiment.

A cycle of eye tracking operation 410 may be referred to as a cycle at which the aforementioned operation 310 is performed. It should be appreciated that FIG. 4 shows how the operations of FIG. 3 are performed in parallel.

The eye tracker 220 may photograph a user using a camera and detect an eye position of the user using the photographed image. For example, the eye tracker 220 may detect the eye position of user at processing sections of E1 and E2 of eye tracking operation 410, using the photographed image.

When the processing sections of E1 and E2 conclude, the eye tracker 220 may update the eye position of user. The eye tracker 220 may update the eye position of user by storing the detected eye position of user. The eye tracker 220 may update the eye position of user by storing the detected eye position of user.

For example, an eye position may be updated at conclusion 411 of the processing section of E1 and conclusion 412 of the processing section of E2.

A cycle of stereo image generating operation 420 may be referred to as a cycle at which the aforementioned operation 320 is performed.

For example, the stereo image generator 230 may consecutively generate stereo images. Concisely, the stereo image generator 230 may consecutively generate the stereo images for processing sections of S1, S2, S3, S4, and S5.

The stereo image generator 230 may update the stereo images by storing the generated stereo images.

In an example, the stereo image generator 230 may generate stereo images at the processing section of S1, based on an eye position of a user updated at a processing section of E0 (not shown). At the processing section of S2, since the processing section of E1 is ongoing, the stereo image generator 230 may generate stereo images based on a desired (or alternatively, predetermined) eye position of the user. At the processing section of S3, the stereo image generator 230 may generate stereo images based on an eye position of the user updated at the processing section of E1.

A cycle of 3D image rendering operation 430 may be a cycle at which the aforementioned operation 330 is performed.

The renderer 240 may render a 3D image based on the recently updated eye position and at least one of the most recently generated stereo images.

For example, the renderer 240 may consecutively render a 3D image. Concisely, the renderer 240 may consecutively render a 3D image at processing sections of R1 through R10.

For example, at the processing section of R2, since a processing of E1 and S1 is ongoing, the renderer 240 may render a 3D image based on data of E0 and S0. At the processing section of R3, the renderer 240 may render a 3D image based on data associated with E1 and S1. At the processing section of R5, the renderer 240 may render a 3D image based on data associated with E1 and S2.

Since an eye position and stereo images received by an input at the processing section of R3 are updated, a 3D image generated based on a processing result of R3 may be different from a 3D image generated based on a processing result of R2. When the generated 3D image is different from the previous 3D image, the 3D image may be updated.

When the 3D image is updated, an image of video to be output to the displayer 250 may be changed.

Reference is made to an input at a processing section of the renderer 240 when at least one of the detected eye position and the generated stereo images are updated. When the detected eye position and at least one of the generated stereo images are updated, the generated 3D image may be different from the 3D image generated at the previous processing section. In this case, the renderer 240 may update a 3D image.

For example, at processing sections of R3, R5, and R8, the renderer 240 may render a 3D image based on an updated eye position.

Figure 5:
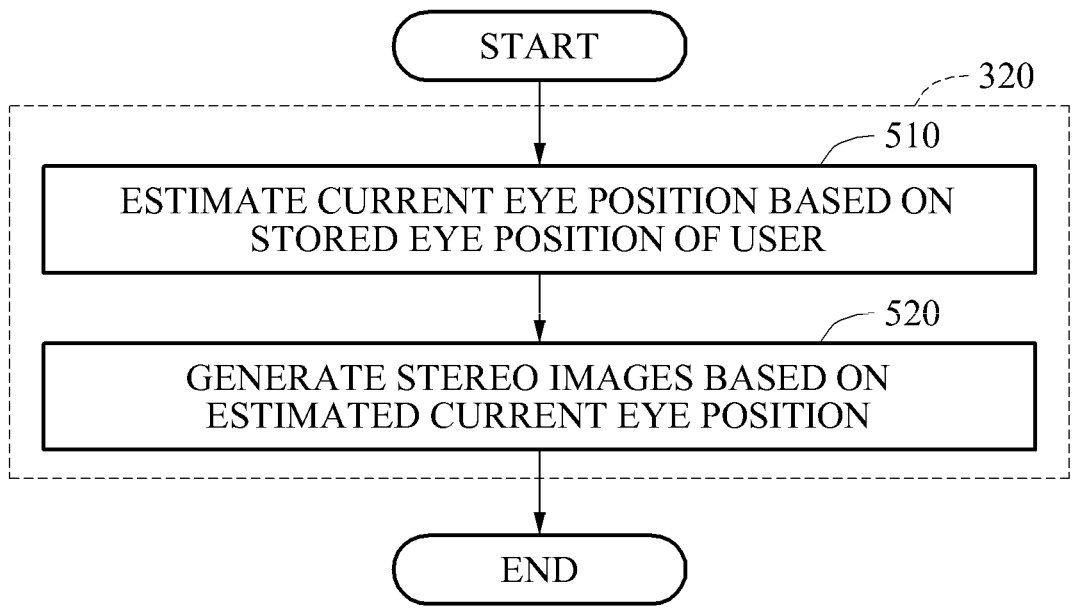
FIG. 5 is a flowchart illustrating a method of generating stereo images according to at least one example embodiment.

FIG. 5 is a flowchart illustrating a method of generating stereo images according to at least one example embodiment.

The aforementioned operation 320 may include operations 510 and 520.

In operation 510, the stereo image generator 230 may estimate a current eye position based on a stored eye position of a user.

For example, the stereo image generator 230 may estimate the current eye position based on a plurality of detected eye positions (e.g., previously detected eye positions). The stereo image generator 230 may generate a speed vector of an eye position. The stereo image generator 230 may estimate the current eye position based on the speed vector. For example, the stereo image generator 230 may calculate a speed vector of numerous detected eye positions, and estimate the current eye position based on the speed vector.

In another example, the stereo image generator 230 may estimate a current eye position using a Kalman filter.

In operation 520, the stereo image generator 230 may generate stereo images based on the estimated current eye position.

Figure 6:
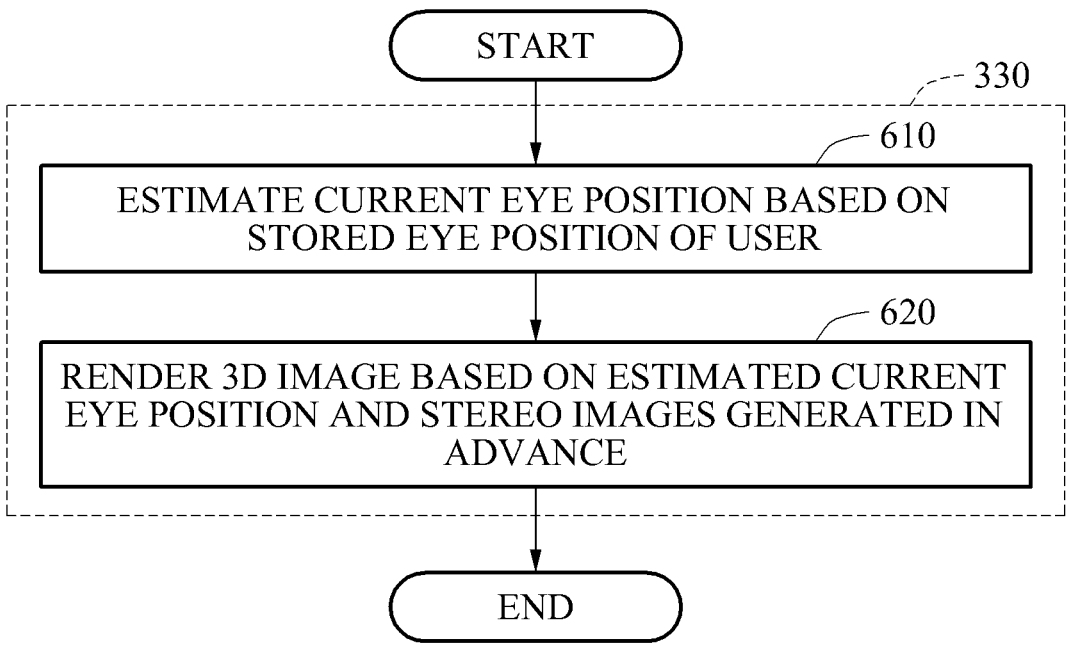
FIG. 6 is a flowchart illustrating a 3D image generating method according to at least one example embodiment.

FIG. 6 is a flowchart illustrating a 3D image generating method according to at least one example embodiment.

The aforementioned operation 330 may include operations 610 and 620.

In operation 610, the renderer 240 may estimate a current eye position based on a stored eye position (e.g., a previously detected eye position) of a user.

For example, the renderer 240 may estimate a current eye position based on a plurality of detected eye positions (e.g., a plurality of previously detected eye positions). The renderer 240 may generate a motion vector of an eye position. The renderer 240 may estimate the current eye position based on the motion vector.

In operation 620, the renderer 240 may render a 3D image based on the estimated current eye position and stereo images generated in advance.

FIG. 7 is a flowchart illustrating a 3D image generating method according to at least one example embodiment.

In operation 710, the image generator 210 may receive an image.

Operation 710 may be performed in parallel with operations 310, 320, and 330 of FIG. 3.

Operation 320 may include operations 722 through 728 detailed in the following.

In operation 722, the stereo image generator 230 may detect a received frame or a foreground of an image.

In operation 724, the stereo image generator 230 may calculate a motion vector of the detected foreground. The stereo image generator 230 may calculate the motion vector of the foreground based on a plurality of frames or images.

In operation 726, the stereo image generator 230 may estimate a current position of the foreground based on the motion vector.

In operation 728, the stereo image generator 230 may generate stereo images based on the estimated current position of the foreground.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor (i.e., a special purpose processor), a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating a three-dimensional (3D) image, the method comprising:
    detecting a plurality of current eye positions of a user's eyes consecutively according to a first cycle;
    generating respective stereo images for both eyes of the user based on at least one current eye position of the plurality of current eye positions of the user's eyes, the generating performed consecutively according to a second cycle;
    rendering a 3D image consecutively based on another at least one current eye position of the plurality of current eye positions of the user's eyes and previously generated stereo images, the rendering performed consecutively according to a third cycle; and
    displaying the consecutively-rendered 3D images to the user,
    wherein the detecting, the generating, and the rendering are performed in parallel and asynchronously, based on the first, second, and third cycles being different and asynchronized from each other, such that
        the detecting includes storing each current eye position of the plurality of current eye positions between consecutive detections of the user's eyes according to the first cycle,
        the generating includes generating the respective stereo images based on one current eye position of the plurality of current eye positions that was stored most recently prior to the generating the respective stereo images and storing the respective stereo images that were most recently generated respective stereo images between consecutive generations of respective stereo images according to the second cycle, the one current eye position that was stored most recently prior to the generating the respective stereo images being a first eye position, and
        the rendering includes rendering the 3D image based on both another one current eye position of the plurality of current eye positions that was stored most recently prior to the rendering the 3D image and the respective stereo images that were stored most recently prior to the rendering the 3D image, the another one current eye position that was stored most recently prior to the rendering the 3D image being a second eye position, the second eye position being separate from the first eye position.

2. The method of claim 1, wherein the detecting comprises:
    photographing the user using a camera to generate a photographed image of the user; and detecting at least one current eye position of the plurality of current eye positions of the user's eyes using the photographed image of the user.

3. The method of claim 1, wherein the rendering comprises:
estimating a current eye position based on the second eye position; and
rendering the 3D image based on the estimated current eye position and the respective stereo images that were stored most recently prior to the rendering the 3D image.

4. The method of claim 1, wherein the generating comprises:
estimating a current eye position based on the first eye position; and
generating the respective stereo images based on the estimated current eye position.

5. The method of claim 4, wherein the estimating comprises:
calculating a speed vector of a plurality of previously detected eye positions; and
estimating the current eye position based on the speed vector.

6. The method of claim 1, wherein the generating comprises different operation cycles based on types of contents to be displayed.

7. The method of claim 1, further comprising:
receiving an image,
wherein the generating comprises generating the respective stereo images using the image.

8. The method of claim 7, wherein the generating comprises:
detecting a foreground of the image;
calculating a motion vector of the detected foreground;
estimating a current position of the foreground in the image based on the calculated motion vector; and
generating the respective stereo images based on the estimated current position.

9. The method of claim 1, wherein the generating respective stereo images comprises receiving the previously generated stereo images.

10. An apparatus for generating a three-dimensional (3D) image, the apparatus comprising:
a memory storing a program of instructions; and
a processor configured to execute the program of instructions to
detect a plurality of current eye positions of a user's eyes consecutively according to a first cycle,
generate respective stereo images for both eyes of the user based on at least one current eye position of the plurality of current eye positions of the user's eyes, the generating performed consecutively according to a second cycle;
render a 3D image in parallel with the detecting based on another at least one current eye position of the plurality of current eye positions of the user's eyes and previously generated stereo images, the rendering performed consecutively according to a third cycle, and
display the consecutively-rendered 3D images to the user,
wherein the detecting, the generating, and the rendering are performed in parallel and asynchronously, based on the first, second, and third cycles being different and asynchronized from each other, such that
the detecting includes storing each current eye position of the plurality of current eye positions between consecutive detections of the user's eyes according to the first cycle,
the generating includes generating the respective stereo images based on one current eye position of the plurality of current eye positions that was stored most recently prior to the generating the respective stereo images and storing the respective stereo images that were most recently generated respective stereo images between consecutive generations of respective stereo images according to the second cycle, the one current eye position that was stored most recently prior to the generating the respective stereo images being a first eye position, and
the rendering includes rendering the 3D image based on both another one current eye position of the plurality of current eye positions that was stored most recently prior to the rendering the 3D image and the respective stereo images that were stored most recently prior to the rendering the 3D image, the another one current eye position that was stored most recently prior to the rendering the 3D image being a second eye position, the second eye position being separate from the first eye position.

11. The apparatus of claim 10, the processor further configured to execute the program of instructions to
estimate a current eye position based on the first eye position, and
generate the respective stereo images based on the estimated current eye position.

12. The apparatus of claim 11, the processor further configured to execute the program of instructions to
calculate a speed vector of a plurality of previously detected eye positions, and
estimate the current eye position based on the speed vector.

13. The apparatus of claim 11, the processor further configured to execute the program of instructions to perform different operation cycles based on types of contents to be displayed.

14. The apparatus of claim 11, the processor further configured to execute the program of instructions to:
receive an image, and
generate the respective stereo images using the image.

15. The apparatus of claim 11, the processor further configured to execute the program of instructions to
detect a foreground of the image,
calculate a motion vector of the detected foreground,
estimate a current position of the foreground in the image based on the calculated motion vector, and
generate the respective stereo images based on the estimated current position.

* * * * *